Patented Nov. 8, 1927.

1,648,516

UNITED STATES PATENT OFFICE.

HEINRICH von HOCHSTETTER, OF KONSTANZ, GERMANY, ASSIGNOR TO THE FIRM HOLZVERKOHLUNGSINDUSTRIE AKTIENGESELLSCHAFT, OF KONSTANZ, GERMANY.

MAKING ANHYDROUS SALTS OF FATTY ACIDS.

No Drawing. Application filed December 8, 1926, Serial No. 153,451, and in Germany December 18, 1925.

In my copending application I have described a method for making anhydrous salts of the lower members of the fatty acid series, which consists in reacting anhydrous esters of the fatty acids with anhydrous metal hydroxides in presence of organic solvents for example alcohols, in which the metal hydroxides are dissolved.

Further researches upon this process have shown that the above-described reaction may also be carried through without the presence of organic solvents, when the reacting mixture is carefully distributed, especially in the beginning of the reaction. This is for example the case when the reacting mixture is violently stirred from the beginning of the reaction until sufficient amounts of alcohol are liberated from the ester. It has been found that when working under these conditions even lump metal hydroxides may be used as starting materials. But it is preferable to use powdered or finely granulated metal hydroxides to start with.

*Example.*

In a stirring apparatus provided with a reflux condenser molecular amounts of ethyl acetate and sodium hydroxide are carefully mixed by violent stirring. The stirrer is stopped, when a sample drawn shows the end of the reaction. The crystalline mash obtained consists of anhydrous sodium acetate and ethyl alcohol, which can be removed by the usual methods for example centrifuging or distillation: The sodium acetate is obtained in form of very fine white crystals. The liberated ethyl alcohol is recovered in a very pure state.

Many experiments have shown, that the reaction is not disturbed for example by the formation of lumps or crusts, this being due to the careful distribution of the reactants as described above.

I claim:

1. A method for making anhydrous salts of the lower members of the fatty acid series which consists in reacting anhydrous esters of the fatty acids with anhydrous metal hydroxides, the reacting mixture being carefully mixed during the reaction.

2. A method for making anhydrous salts of the lower members of the fatty acid series which consists in reacting anhydrous esters of the fatty acids with anhydrous metal hydroxides, the reacting mixture being rapidly agitated during the reaction.

3. A method for making anhydrous salts of the lower members of the fatty acid series which consists in reacting anhydrous esters of the fatty acids with pulverized anhydrous metal hydroxides, the reacting mixture being carefully mixed during the reaction.

4. A method for making anhydrous sodium acetate which consists in reacting anhydrous ethyl acetate and sodium hydroxide with pulverized anhydrous sodium hydroxide, the reacting mixture being rapidly agitated during the reaction.

5. A method for making anhydrous salts of the lower members of the fatty acid series which comprises reacting anhydrous esters of the fatty acids with anhydrous metal hydroxides, the reacting mixture being rapidly agitated until substantial amounts of alcohol are liberated.

6. A method for making anhydrous sodium acetate which comprises reacting anhydrous ethyl acetate with pulverized anhydrous sodium hydroxide, the reacting mixture being rapidly agitated until substantial amounts of ethyl alcohol are liberated.

In testimony whereof I affix my signature.

Dr. HEINRICH von HOCHSTETTER.